Aug. 13, 1968  TSUNEHIKO ITO ET AL  3,396,994
HOSE COUPLING FOR REINFORCED FLEXIBLE HOSE
Filed Oct. 28, 1966  2 Sheets-Sheet 1
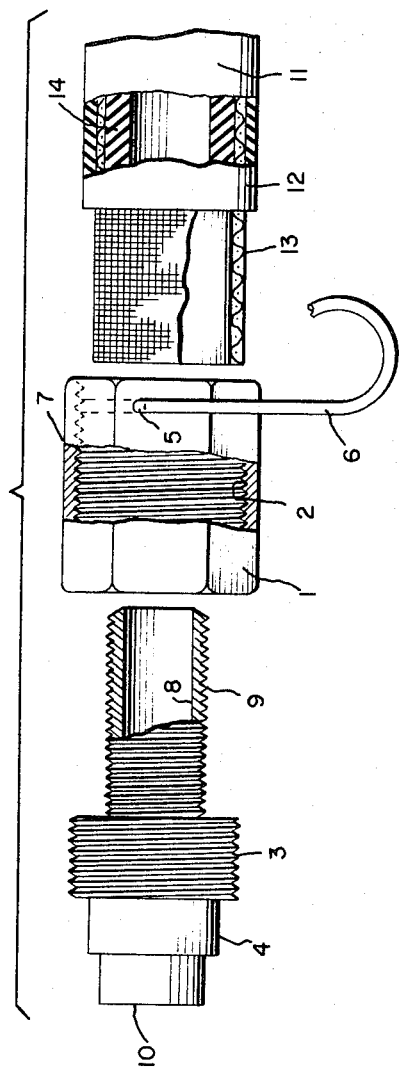
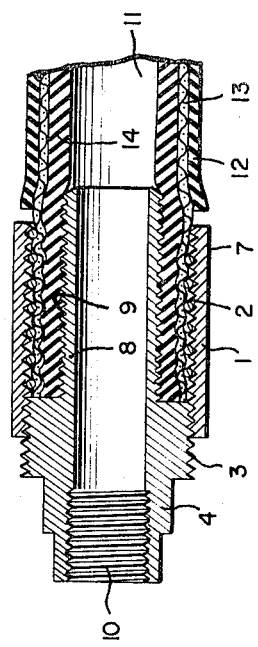
INVENTORS
TSUNEHIKO ITO
SHINGI NAGAOKA
YOSHIYA OCHIAI
BY Wenderoth, Lind & Ponack
ATTORNEYS Aug. 13, 1968  TSUNEHIKO ITO ET AL  3,396,994
HOSE COUPLING FOR REINFORCED FLEXIBLE HOSE
Filed Oct. 28, 1966  2 Sheets-Sheet 2

INVENTORS
TSUNEHIKO ITO
SHINGI NAGAOKA
YOSHIYA OCHIAI

BY, Wenderoth, Lind & Ponack

ATTORNEYS

United States Patent Office 3,396,994
Patented Aug. 13, 1968

3,396,994
HOSE COUPLING FOR REINFORCED
FLEXIBLE HOSE
Tsunehiko Ito, 304 Hon-machi, and Shingi Nagaoka, 1125
Asahi-machi, both of Nabari-shi, Mie Prefecture, Japan,
and Yoshiya Ochiai, 23 1-chome, Higashi, Showa-cho,
Abeno-ku, Osaka-shi, Osaka Prefecture, Japan
Filed Oct. 28, 1966, Ser. No. 590,425
Claims priority, application Japan, Nov. 13, 1965,
40/69,887; Aug. 17, 1966, 41/77,758
2 Claims. (Cl. 285—248)

ABSTRACT OF THE DISCLOSURE

A hose coupling for a flexible hose. The coupling has an outer annular cylinder the surface of the bore thereof having a spiral groove therein, and the cylinder having an opening through the wall thereof leading into the groove, through which a wire can be led. The coupling also has an inner annular cylinder member having a tubular stem with an uneven surface thereof. The tubular stem is inserted into the stripped end of the flexible hose, and the outer annular cylinder is then moved onto the stripped end while rotating it so as to entrain the wire between the outer annular member and the surface of the stripped portion of the hose. Coupling means between the outer annular cylinder and inner annular cylinder are provided which couple the two parts to each other when the coupling is fully assembled.

---

The present invention relates to flexible hose couplings and in particular to means for securing reinforced flexible hose to the coupling member. Moreover, it is concerned with methods of connecting reinforced flexible hose to such couplings.

In the prior art, when securing reinforced flexible hose of the type wherein a woven or braided reinforcement is covered with a sheath of rubber, neoprene or the like to a hose coupling, such sheath is stripped off or otherwise removed, a lead or similar soft ductile ring is telescoped oved the stripped end of the said hose, and the stripped end of the hose and ductile ring are placed into an internally deformed cupped end of a coupling member over a centrally disposed stem within the said cupped end of the said coupling member. The said cupped end of the coupling member is then crimped, swaged or otherwise pressed into engagement with the soft ductile metal ring which is thereby deformed into intimate engagement with and into the interstices of the exposed wire reinforcement of the flexible hose whereby to anchor the said flexible hose within the cupped end of the coupling member. Another known means for securing reinforced flexible hose of the said type is by securing the stripped end of the hose between a threaded inner shell within the stripped end and a threaded outer shell threaded over the stripped end, and the coupling member can be used repeatedly.

The said prior art constructions, while satisfactory for certain uses, still have some disadvantages. For instance, in the former case, a complicated and expensive high pressure apparatus is required for connecting the reinforced flexible hose to the couplings and, once connected, the coupling member can not be used again. On the other hand, in the latter case, such means may be deemed advantageous insofar as repeated uses of the coupling member are concerned, but such means has an inherent disadvantage that, as the reinforced layer of the hose and the threaded portion of the coupling member are liable to hurt each other, application of a previously used coupling member to a hose may result in a somewhat unsatisfactory fit.

With the foregoing in view, the primary object of the present invention is to provide a coupling member for reinforced flexble hose which will withstand repeated uses and will not become loosened by repeated connecting of the hose while the hose is tensioned with respect to the fitting.

Another object of this invention is to provide a coupling member for reinforced flexible hose which does not require any complicated and expensive high pressure apparatus for its application but requires only a simple hand tool such as a wrench for the connecting operation.

A further object of the invention is to provide a simple and reliable method of connecting reinforced flexible hose to a coupling member, which is also easy and safe in releasing.

These objects are met by the provision of a hose coupling for a flexible hose. The coupling has an outer annular cylinder the surface of the bore thereof having a spiral groove therein, and the cylinder having an opening through the wall thereof leading into the groove, through which a wire can be led. The coupling also has an inner annular cylinder member having a tubular stem with an uneven surface thereof. The tubular stem is inserted into the stripped end of the flexible hose, and the outer annular cylinder is then moved onto the stripped end while rotating it so as to entrain the wire between the outer annular member and the surface of the stripped portion of the hose. Coupling means between the outer annular cylinder and inner annular cylinder are provided which couple the two parts to each other when the coupling is fully assembled.

Other objects of the present invention will be apparent to those conversant with the art to which the present invention pertains by reference to the following detailed description taken in connection with the accompanying drawings, in which:

FIG. 1 is an exploded longitudinal sectional view of a flexible hose coupling for reinforced hose embodying the present invention.

FIG. 2 is a longitudinal sectional view of the flexible hose coupling disclosed in FIG. 1 as assembled.

Figure 3:
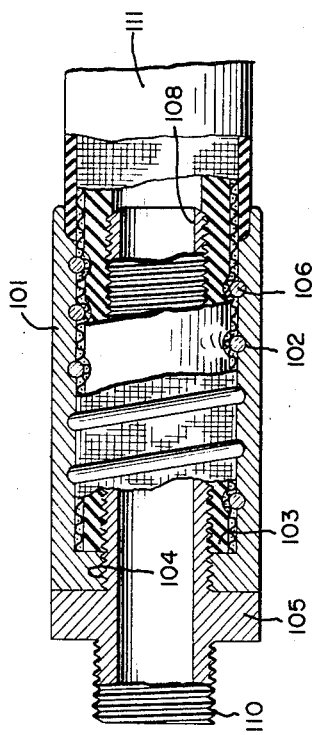
FIG. 3 is a longitudinal sectional view of another embodiment of the flexible hose coupling for reinforced hose as assembled and FIG. 4 is a longitudinal sectional view of still another embodiment of the flexible hose coupling for reinforced hose assembled as FIG. 3.

Referring now to the drawings wherein like numerals refer to like and corresponding parts throughout the several views, one of the illustrative embodiments of the present invention which is disclosed in FIGS. 1 and 2 and may be deemed to be the most basic comprises an outer annular cylinder generally designated by the numeral 1 and composed of a female nut having a hexagonal outer shape 7 so that it can be easily gripped by an ordinary wrench. The cylinder 1 has an internally threaded bore 2 and an opening 5 extending through the wall of the cylinder 1 through which a squeezing wire 6 can be inserted, said opening having one end at the outer surface 7 of the said annular cylinder 1 and the other end connected to the groove of the said female threaded bore 2. The coupling further comprises an inner annular cylinder generally designated by the numeral 4 and composed of an externally threaded male bolt portion 3 threadable into the bore 2 of the outer annular cylinder 1, a tubular stem 8 having an uneven surface 9, shown in this particular embodiment as a fine screw thread, over which a flexible hose can be telescoped and a connecting means 10 illustrated as a female threaded portion susceptible of being connected with another fluid system (not shown) at the end opposite the tubular stem 8.

The said squeezing wire 6 is composed of a soft ductile metal having a circular cross section and a diameter fitting closely within the opening 5. A reinforced flexible hose 11, generally composed of an inner tube 14 of rubber, neoprene or the like covered with a woven, meshed or spiral reinforcement 13 which is in turn sheathed with a protective layer 12 of rubber, neoprene or the like, is preferably turned down or otherwise reduced to a smaller diameter at its end which is to be engaged between the outer annular cylinder 1 and the inner annular cylinder 4 in an annular cylindrical space formed between the tubular stem 8 of the inner annular cylinder 4 and the bore 2 of the outer annular cylinder 1.

The screw threaded inner wall of the bore 2 is preferably threaded with a multiple thread and the pitch and the depth thereof are selected so as to receive the squeezing wire 6 therein. In the connecting operation, the tubular stem 8 of the inner annular cylinder 4 is first inserted into the bore of the reinforced flexible hose 11, and then the outer annular cylinder 1 is screwed onto the male bolt portion 3 of the inner annular cylinder 4 from the left end as shown in the figures until its right end covers a small portion of the left end of said hose 11. Next, the tip of the squeezing wire 6 is inserted into the opening 5 of the outer annular cylinder 1 and the screwing operation of the annular cylinder 1 is continued until substantially the whole of the stripped portion (i.e. the portion from which the protective layer is removed) of the reinforced flexible hose 11 is covered by the outer annular cylinder 1. During that operation, the squeezing wire 6 penetrates said flexible hose due to the friction between it and the wire so that the wire finally extends over the full length of the said reinforcement 13 to tighten the said flexible hose upon the said uneven surface of the said tubular stem 8 as shown in FIG. 2. Although the said uneven surface 9 is expediently shown as a screw thread in the drawings, any other uneven surface such as multiple annular grooves can be used.

In this particular embodiment, the reinforcement of the flexible hose is tightened by the squeezing wire having the circular section during the connecting operation which requires only a simple hand tool such as a wrench so that no serious damage is caused thereto and the flexible hose can be used repeatedly.

In addition, the present invention enables the connecting of a coupling to a reinforced flexible hose having an outer diameter of the reinforcement which is relatively small as compared with the inner diameter of the bore of the outer annular cylinder of the coupling by selecting a suitable diameter of the squeezing wire.

FIG. 3 illustrates another embodiment of the present invention wherein a helical groove of half circular cross section 102 is provided on the inside surface of the bore of the outer annular cylinder 101 solely for the purpose of receiving the squeezing wire 106 and accommodating the circular section of the sadi wire 106 therein whereas the screw thread 2 plays both roles of receiving the squeezinjg wire 6 and of screwing onto the male bolt threaded portion of the inner annular cylinder 4 in the embodiment shown in FIGS. 1 and 2. In addition, a female nut threaded portion 104 threadable into the threaded stem 108 which also serves as a fluid tight joint between the hose 111 and the tubular stem 108, is provided for the purpose of connecting the said outer annular cylinder 101 to the said inner annular cylinder 105. A means for connecting this coupling to another fluid system is likewise provided as a male bolt threaded portion 110 in this embodiment.

In this embodiment, the reinforced flexible hose 111 is telescoped into the outer annular cylinder 101 by turning it onto the stripped end of the hose, during which the squeezing wire 106 is drawn in between the bore of the outer annular cylinder 101 and the reinforcement of the hose. Then, the tubular stem 108 of the inner annular cylinder is threaded through the nut portion 104 into the bore of said hose.

Figure 4:
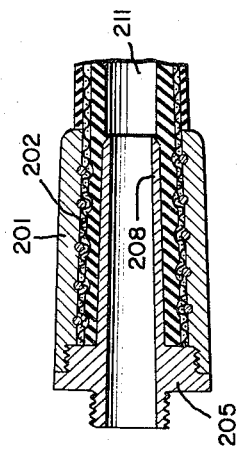

FIG. 4 illustrates another embodiment of the present invention wherein both of the bore 202 of the outer annular cylinder 201 and the tubular stem 208 of the inner annular cylinder 205 are tapered toward their respective corresponding ends so that the reinforced flexible hose 21 is telescoped between them more tightly.

In any of the foregoing embodiments, the outer and inner cylinders and the squeezing wire can be made of iron, steel, brass, copper, aluminum, their alloy or the like. Preferably, the inner and outer cylinders may be of a hard metal and the squeezing wire may be of a ductile metal. The opening for receiving the squeezing wire may be a cut out provided on one end of the outer annular cylinder and connected to the groove inside the bore.

Although but a few embodiments of the present invention have been disclosed and described in detail together with a number of suggested forms of the outer and inner annular cylinders and the squeezing wire, it is obvious that many changes may be made in the size, shape, arrangement and detail of the various elements of the present invention without departing from the spirit thereof as defined by the appended claims, the specific disclosures herein and in the drawings being intended to be illustrative and not limiting.

What is claimed is:

1. A hose coupling for a flexible hose comprising an outer annular cylinder having an internally screw threaded bore extending the entire length thereof forming a spiral groove and an opening through the wall of the cylinder, a squeezing wire extending through said opening and along the spiral groove of said internally threaded bore, an inner annular cylinder having at least one externally screw threaded bolt portion threadable into said threaded bore of said outer annular cylinder, a tubular stem having an uneven surface for being telescoped into the end portion of the flexible hose to which the coupling is to be attached, and a means on the opposite end of said inner annular cylinder for connecting the coupling to another fluid system, said outer annular cylinder and said tubular stem of said inner cylinder, when assembled, defining between them an annular cylindrical space for receiving the end portion of the flexible hose, and the squeezing wire in said groove pressing the flexible hose tightly against said uneven portion of the said inner annular cylinder, having been inserted through said opening and extending over substantially the full length of said groove, said outer cylinder being threaded on said inner cylinder from the end remote from said tubular stem.

2. A hose coupling as claimed in claim 1 in which the outside diameter of the tubular extension is slightly larger than the inside diameter of the hose to which the coupling is to be attached, and the inside diameter of the tubular extension is only slightly smaller than the inside diameter of the hose, whereby when the tubular extension is inserted into the hose, the hose is slightly expanded and the difference between the inside diameter of the tubular extension and the unexpanded part of the hose is very small and fluid can pass through the hose and coupling.

References Cited

UNITED STATES PATENTS

| | | | |
|---|---|---|---|
| 1,874,397 | 8/1932 | Webb | 285—305 |
| 1,977,219 | 10/1934 | Williams | 285—251 X |
| 2,799,520 | 7/1957 | De Rocher | 285—251 X |

EDWARD C. ALLEN, *Primary Examiner.*

THOMAS F. CALLAGHAN, *Assistant Examiner.*